United States Patent [19]
Wissman

[11] Patent Number: 5,568,474
[45] Date of Patent: Oct. 22, 1996

[54] PING-PONG COMMUNICATION METHOD AND APPARATUS

[75] Inventor: Charles H. Wissman, Oceanside, Calif.

[73] Assignee: Tempo Research Corporation, Vista, Calif.

[21] Appl. No.: 380,603

[22] Filed: Jan. 30, 1995

[51] Int. Cl.$^6$ ........................................................ H04L 7/04
[52] U.S. Cl. ........................ 370/29; 370/85.2; 370/103; 375/358; 359/135
[58] Field of Search .................... 370/8, 24, 29, 370/32, 85.1, 85.2, 85.3, 100.1, 103; 375/220, 238, 358; 359/113, 135, 137, 140

[56] References Cited

U.S. PATENT DOCUMENTS

| | | | |
|---|---|---|---|
| 4,720,827 | 1/1988 | Kanaji | 370/4 |
| 5,022,050 | 6/1991 | Tanaka | 370/29 X |
| 5,046,063 | 9/1991 | LaGess | 370/29 |
| 5,075,791 | 12/1991 | Hastings | 359/135 |
| 5,239,562 | 8/1993 | Grimes | 375/358 |
| 5,408,350 | 4/1995 | Perrier et al. | 359/113 X |

Primary Examiner—Douglas W. Olms
Assistant Examiner—Russell W. Blum
Attorney, Agent, or Firm—Amster, Rothstein & Ebenstein

[57] ABSTRACT

An improved method and apparatus for achieving ping-pong communication over a single channel comprises a circuit (located at each communication station) which adjusts the transmission frequencies of two or more communicating stations such that each communicating station is transmitting at the same frequency as the other communicating stations. Additionally, the circuit provides a time delay between data receipt and data transmission at a given station such that data is not transmitted from the given station when data is being received by the given station. In the preferred embodiment cross coupled phase-lock loops are employed and the delay provided is such that a data pulse is transmitted half way between the receipt of two consecutive data pulses.

17 Claims, 6 Drawing Sheets

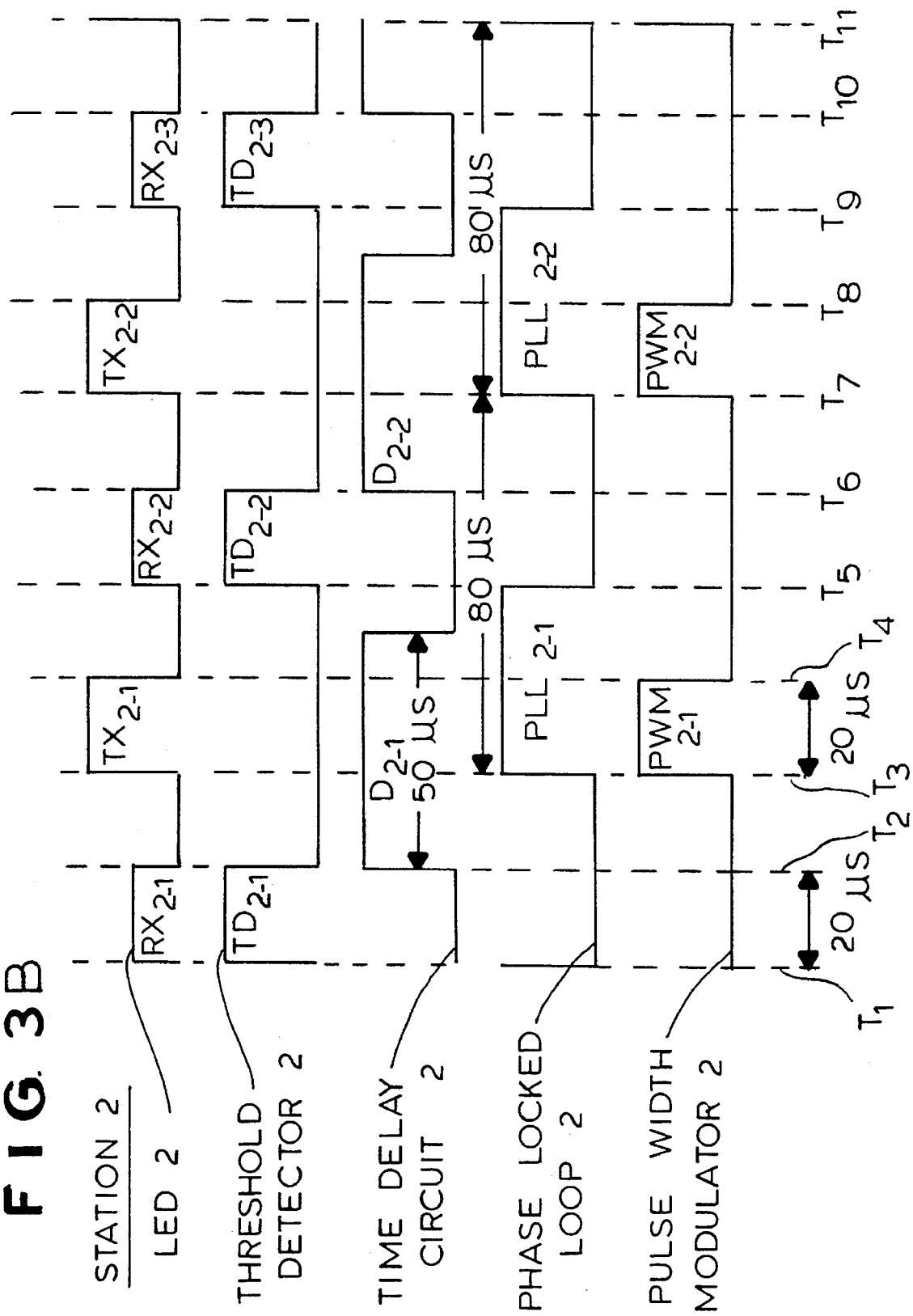

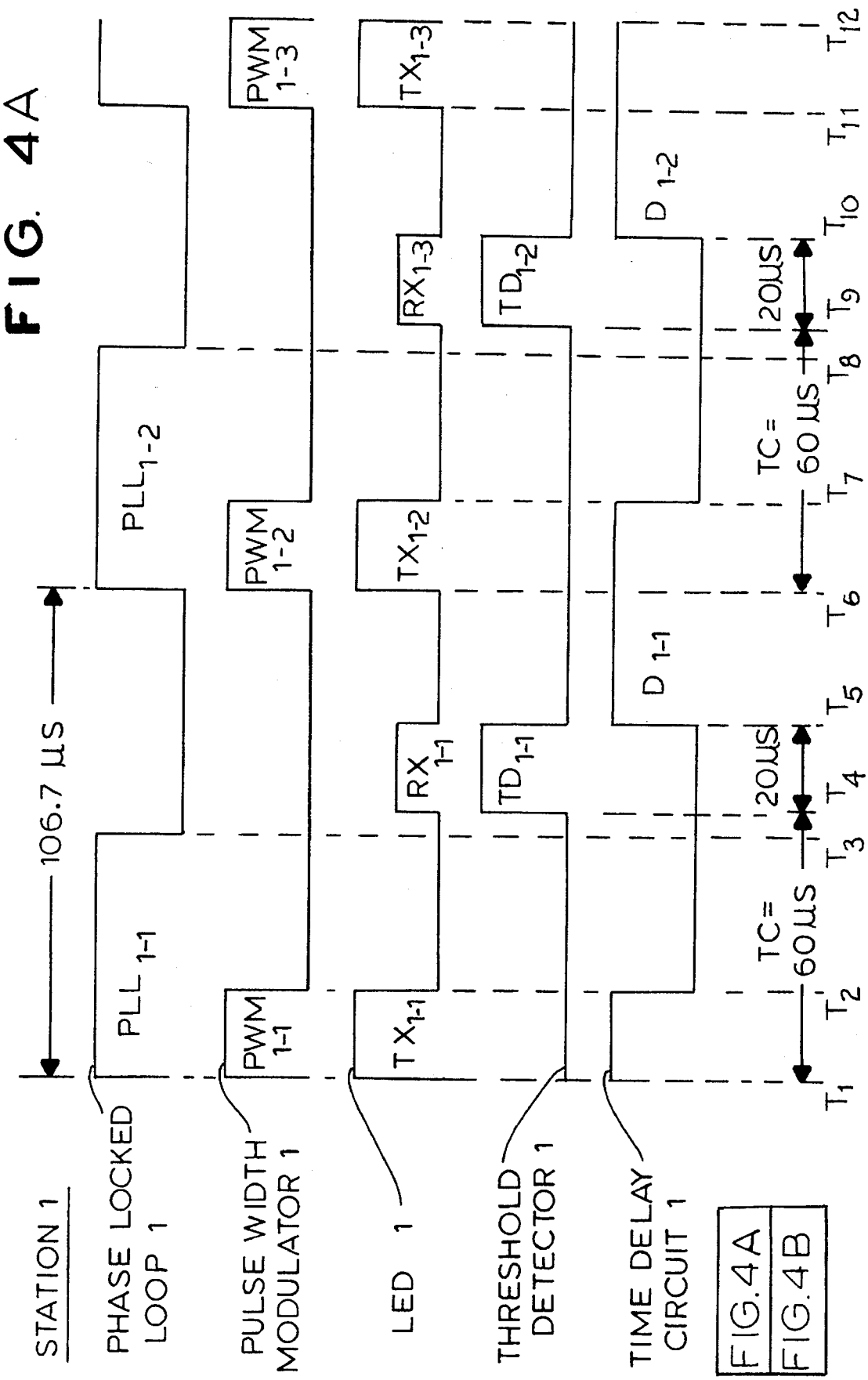

PING-PONG COMMUNICATION METHOD AND APPARATUS

BACKGROUND OF THE INVENTION

The present invention relates to an improved method and apparatus for full duplex communication over a communication channel; specifically to an improved method for achieving ping-pong communications over an optical fiber.

Modern telephone systems require that a calling and a called station be able to communicate simultaneously. To achieve this objective, full duplex communication is used wherein each station can transmit/receive concurrently. Full duplex communication can be achieved with separate transmit/receive channels or over a single channel by properly timing data transmission and data reception at each station (allowing for apparent simultaneous transmission and reception). Existing ping-pong communication schemes which allow apparent full duplex communication over a single channel require more complex and more costly circuitry than that of the present invention.

For instance, Hastings U.S. Pat. No. 5,075,791 discloses a method of apparent full duplex communication which involves the compression and transmission of data in bursts through an optical fiber. A transmitting station becomes receptive to incoming bursts of data sent from a distant station only after a fixed delay period following the transmission of data. To achieve this result, Hastings requires relatively complex and expensive timing and data compression circuitry. Also, Hastings does not appear to compensate for a change in propagation delay that occurs as the optical fiber's length changes.

LaGess U.S. Pat. No. 5,046,063 discloses a ping-pong communication system and method wherein one station is designated a master and another station is designated a slave. The master station transmits data bursts at fixed time intervals while the slave station transmits data burst only upon the receipt of data from the master station. Either the master station transmission rate or the slave's response time may be varied to ensure that data transmission does not occur during the time period that data should be received.

Kanaji U.S. Pat. No. 4,720,827 employs a master/slave scheme similar to that of LaGess with the additional inclusion of Sync supervision and time setting information within the data bursts. Master/slave systems are undesirable because they introduce complexity and expense to a communications system. For instance, because each station must be able to function as both a master and a slave, both master and slave control circuitry must be included in each station.

Accordingly, it is an object of the present invention to provide an apparatus and method which permits apparent full duplex communication over a communication channel with much simpler and less expensive circuitry than that required of master/slave or data compression architectures. It is a further object of the invention to provide an apparatus and method which compensates for variations in channel propagation delay.

SUMMARY OF THE INVENTION

In accordance with the invention, full duplex communication is achieved over a single communication channel by adjusting the timing and frequency of the data exchange at each station so as to avoid data collision regardless of propagation delay between the stations.

A data communication system typically comprises a channel through which data is exchanged, and communication stations operatively connected to the channel. In accordance with the present invention, each station connected to the communication channel includes a control unit which controls the data communication frequency of the station. More specifically, each station connected to the channel is configured so as to have a nominal free running frequency. Preferably, the free running frequency of each station is approximately the same as that of the other stations connected to the channel. When a first station wants to transmit information to a second station, the first station initially transmits that information at its free running frequency. The second station receives that information and the control units in each station thereafter adjust the data communication frequency of each station until both the first and the second station operate to transmit information between them at the same frequency (the adjusted frequency). Preferably, the control units in each station are configured such that the adjusted frequency satisfies the following equation:

$$f = [(2n+1)/4(T_c + T_i)]$$

where: f represents the adjusted frequency, n represents an integer number 0, 1, 2, 3 . . . , $T_c$ represents the channel propagation delay, and $T_i$ represents an internal time delay associated with each station. When two communicating stations operate at the same adjusted frequency, and when each station provides an internal delay between data receipt and data transmission, data collision is avoided and apparent full duplex communication over a single line can be achieve without expensive data compression or master/slave circuitry.

In the presently preferred embodiment of the invention, each station includes circuitry for both sending and receiving electrical or optical voice or data signals. The circuitry employed during data transmission (transmit circuitry) includes a microphone, a low-pass filter, a pulse stretcher circuit, a transmit/receive switch, a transmit/receive means (in the embodiment permitting optical communication, the transmit/receive means comprises a light emitting diode (LED)), and a control unit including a pulse-width modulator, a delay circuit and a phase-lock loop. The circuitry employed during data receipt (receive circuitry) includes a transmit/receive means (in optical communication the same LED may be used for both transmit and receive operations) an amplifier, a transmit/receive switch (which also preferably functions as part of the transmit circuitry), a threshold detector, a pulse-width demodulator, a low-pass filter, a DC filter, an amplifier and a speaker. In addition, the time delay circuit and the phase-lock loop which are part of the control unit are used during receive operations. In the preferred embodiment, the time delay circuit and the phase-lock loop of the control unit receive a portion of an incoming (receive) signal such that the frequency and the phase of the transmitted and received signals can be adjusted in accordance with this invention to achieve apparent full duplex operation. Also in the preferred embodiment of the invention, a voltage signal output from a telephone microphone is periodically sampled so as to comprise a series of data signals in the form of voltage pulses which are transmitted (and therefore received) one voltage pulse at a time.

In operation, when a station, for example Station 1, desires to transmit information over the communication channel to a remote station, for example Station 2 on the channel, information is input to a standard telephone microphone, the output of which is applied to a low-pass filter which eliminates high frequency components of the voltage signal to prevent distortion, outputting a filtered voltage signal. The output of the low-pass filter is applied to the pulse-width modulator of the control unit the frequency of which is controlled by the phase-lock loop which established the free running frequency of Station 1. In operation, when the output from the phase-lock loop is high, the pulse-width modulator samples the filtered voltage signal from the telephone microphone creating an output signal in the form of a voltage pulse. Each voltage pulse output from the pulse-width modulator is received by the LED which converts the voltage pulse into an optical pulse which is transmitted over an optical fiber and received by a distant telephone station.

The series of voltage pulses output from the pulse-width modulator is also passed through the pulse stretcher circuit to the transmit/receive switch. Upon receipt of each pulse, the transmit/receive switch opens, disconnecting the LED from the receive circuitry thus preventing the voltage pulse output from the pulse-width modulator of Station 1 from being detected by the receive circuitry of Station 1. The pulse stretcher circuit is interposed between the pulse-width modulator and the transmit/receive switch so that the voltage pulse output from the pulse-width modulator is stretched prior to being received by the transmit/receive switch, in order to maintain the transmit/receive switch in an open position for a slightly longer period of time than that required by the LED to complete transmission of the unstretched voltage pulse and to recover therefrom. Use of the pulse stretcher circuit in combination with the transmit/receive switch ensures that a voltage pulse being transmitted by Station 1 will not erroneously be passed through the transmit/receive switch to Station 1's receive circuitry.

The time between two consecutively received voltage pulses can be effectively described as a 360° phase difference between the two voltage pulses. Preferably, employing this description, there is a 180° phase difference between the time a station receives a voltage pulse and the time that same station transmits a voltage pulse. In other words, a voltage pulse is transmitted halfway (180°) between two consecutively received voltage pulses (360°). To achieve this result, the received voltage pulse is applied to the phase-lock loop through the time delay circuit of the transmitting circuitry. The time delay circuit delays the received voltage pulse by a preselected time prior to passing it to the phase-lock loop of the transmitting circuitry. The time delay caused by the time delay circuit is such that when combined with the delay associated with the phase-lock loop of the transmitting circuitry, the total delay preferably creates a 180° phase difference between the time a station begins receiving a voltage pulse and the time that same station begins transmitting its next voltage pulse. The 180° phase difference is understood to describe the timed relationship of the series of transmitted and received voltage pulses.

It is understood that phase shift values set forth above are approximations and that the phase shift may vary over a range of values. For example, although the internal time delay circuit 16 is described as providing a 90° phase shift, the actual phase shift created by time delay circuit 16 will vary between approximately 36° and 108° (when the free running frequency of the phase-lock loops is equal to 10 KHz and the internal time delay associated with each station equals 20 μs). This range is calculated by solving the following equations:

$$f_1 = \frac{n}{2(T_i + T_c)} \quad (1)$$

and $$f_2 = (2n+1)/[4(T_c+T_i)] \quad (2)$$

where:
- $f_1$=frequencies which the phase-lock loops avoid;
- $f_2$=frequencies which the phase-lock loops seek (the frequencies at which the phase-lock loops may lock);
- $n$=an integer value representing a multiple of 360°, i.e., 0, 1, 2 . . . ;
- $T_c$=the propagation delay of the channel; and
- $T_i$=the time delay created by the time delay circuits.

To determine the range over which the phase shift can vary, the worst case value for $T_c$ is computed using equation (1) and a value of $T_i$ determined by the time delay circuits that are used, and by assuming that the value of $f_1$ equals the value of the free running frequency. For example, for a free running frequency of the phase-lock loops equal to 10 KHz, and for $T_i$=20 μs, and n=1, the value of $T_c$ is determined from equation (1) to equal 30 μs.

This calculated value of $T_c$ is then used in equation (2) to determine the range of frequencies at which the phase-lock loops may lock. To solve equation (2), two values of n are selected which result in the two values of $f_2$ which are closest to the free running frequency (10 KHz) (one frequency being higher than the free running frequency, and one frequency being lower than the free running frequency). Selecting n=0, the value of $f_2$ is 5 KHz, and selecting n=1, the value of $f_2$ is 15 KHz. Thus, these values for n result in the values of $f_2$ closest to 10 KHz, the free running frequency of the phase-lock loops. The periods ($1/f_2$) associated with 5 KHz and with 15 KHz are then calculated (the period for 5 KHz is 200 μs, and the period for 15 KHz is 66.7 μs).

Next, the following equation is solved using the two period values:

$$\frac{P}{360°} = \frac{T_i}{X} \quad (3)$$

where:
- P=period
- X=phase shift associated with $T_i$

The ratio in equation (3) uses 360° because 360° represents a full period of the wave form. Solving equation (3) using the two values of P provides the range over which the phase shift varies. In this case, for P equal to 66.7 μs and $T_i$ equal to 20 μs, the phase shift is 108° and for P equal to 200 μs and $T_i$ equal to 20 μs, the phase shift is 36°.

Based on the foregoing example it would be possible for a worker of ordinary skill in the art to determine the range of possible phase shifts created by the internal time delay circuits used in other systems.

In operation, when an optical pulse is transmitted to Station 1, the transmit/receive means receives the incoming optical pulse and converts it to a voltage pulse (receive pulse) that is proportional to the optical pulse. The receive pulse is amplified and sent through the transmit/receive switch (which is closed because the pulse-width modulator is not outputting a voltage pulse) to a threshold detector. The threshold detector acts as a filter, discriminating between the receive pulse and random noise or line reflections, and passes only the receive pulse. The receive pulse is passed through the threshold detector to a pulse-width demodulator which demodulates the receive pulse converting it back to the voltage signal as originally sampled from the microphone of the transmitting telephone station. The voltage signal is then filtered to eliminate any aliasing distortion amplified and used to drive the speaker.

Additionally, the receive pulse is applied to the control unit. The control unit's time delay circuit sets the maximum transmission frequency and ensures maximum time separation between transmit and receive voltage pulses. The phase-lock loop of Station 1 and the phase-lock loop of Station 2 adjust the operation frequency of the pulse-width modulators of Station 1 and Station 2 respectively until both stations are transmitting at the same frequency. When this condition is met, the phase-lock loops are said to be "locked up." The phase-lock loops thus lock up so that the station receiving the data (Station 1) operates at the same frequency as the distant station from which the data is transmitted (Station 2). An identical apparatus is employed at each station within the communication system.

In summary, the phase-lock loops in the control units of each station on the communication system are cross coupled with one another so that when two stations are communicating, the output (or transmit) frequency of one station constitutes the input (or receive) frequency of the other station. The phase-lock loops adjust their output frequencies until the frequency of the sending station matches that of the receiving station. Further, the phase-lock loop of each station is configured such that the phase difference between the receive voltage pulse input to the phase-lock loop and the voltage pulse output from the phase-lock loop to the pulse-width modulator is 90°. The input voltage pulse and output voltage pulse of the phase-lock loop will maintain this constant phase difference regardless of any propagation delay associated with the communication channel. This constant 90° phase difference between the time a voltage pulse is input to the phase-lock loop, and the time the phase-lock loop outputs a voltage directing the pulse-width modulator to sample the microphone voltage and output a corresponding voltage pulse to the transmit/receive means, prevents data collision at each station. To further avoid data collision, the preferred embodiment employs a time delay circuit within the control unit which (by providing an additional 90° phase shift) ensures that data transmission occurs 180° out of phase from data receipt.

The present invention provides significant advantages over the prior art. It requires much simpler, and less expensive circuitry than does the prior art. The present invention does not require data compression or the designation of one station as a "master" and the other station as a "slave," thereby reducing the cost and complexity of the circuitry. Further, the present invention automatically adjusts the transmission frequency of each station so as to avoid data collision regardless of the propagation delay associated with the channel.

BRIEF DESCRIPTION OF THE DRAWINGS

The above and related objects, features and advantages of the present invention, will be more fully understood by reference to the following detailed description of the presently preferred embodiments of the invention, when taken in conjunction with the accompanying drawings wherein:

FIG. 3A and 3B are a timing diagram useful in explaining the operation of the transceiver of FIG. 1 wherein the channel propagation delay is 0.

FIGS. 4A and 4B are a timing diagram useful in explaining the operation of the transceiver of FIG. 1 wherein the channel propagation delay is 60 μs.

DESCRIPTION OF THE PREFERRED EMBODIMENT

The present invention comprises a transceiver including a control unit which, in the preferred embodiment, further includes a phase-lock loop, a delay circuit, and a pulse-width modulator. The preferred embodiment is configured such that regardless of the propagation delay of the communications channel, transmitted and received signals will not collide. This is accomplished by ensuring that when two stations communicate they do so at the same frequency, and by delaying transmission at each station such that it occurs halfway between two consecutively received voltage pulses.

Figure 1:
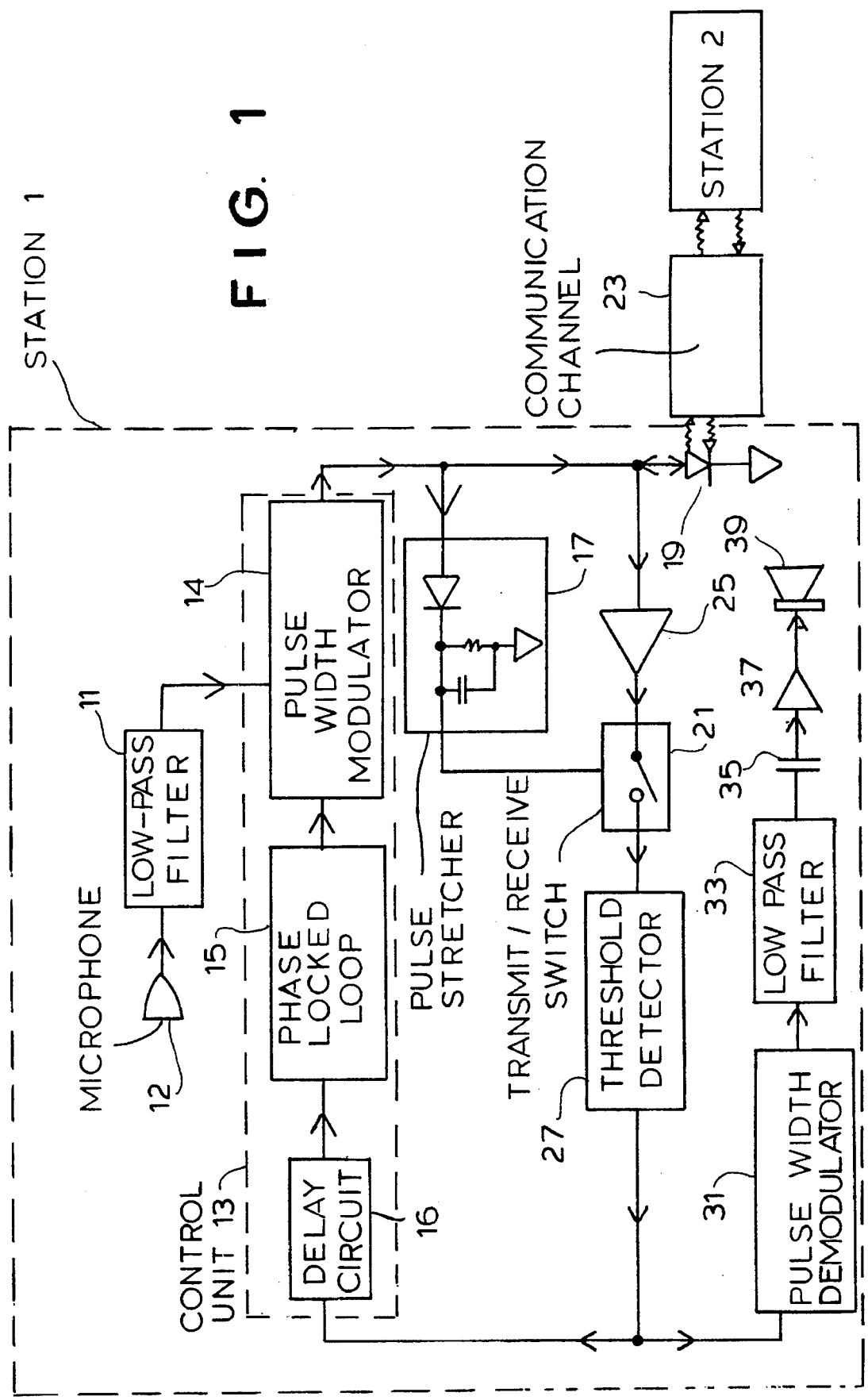
FIG. 1 is a block diagram of the preferred embodiment of a transceiver of the invention for use in a complete ping-pong fiber optic telephone communication system.

FIG. 1 shows a block diagram of the preferred embodiment of the transceiver of the invention, as employed within each station of a complete ping-pong fiber optic communication system. The transceiver includes a low-pass filter 11 which is coupled so as to receive a voltage signal from a microphone 12 of a standard telephone. Low-pass filter 11 is coupled to a control unit 13. Control unit 13 includes a pulse-width modulator 14, a phase-lock loop 15 and a time delay circuit 16. An input of pulse-width modulator 14 is coupled to the output of low-pass filter 11, and an input of pulse-width modulator 14 is coupled to an output of phase-lock loop 15 thereby allowing phase-lock loop 15 to control the operation of pulse-width modulator 14. Further, time delay circuit 16 is coupled to an input of phase-lock loop 15. A pulse stretcher circuit 17 is coupled to an output of pulse-width modulator 14, as is a light emitting diode (LED) 19. A transmit/receive switch 21 is coupled to an output of pulse stretcher circuit 17 such that the output of pulse-width modulator 14 is coupled to transmit/receive switch 21 through pulse stretcher circuit 17. Low-pass filter 11, pulse-width modulator 14, phase-lock loop 15, pulse stretcher circuit 17, transmit/receive switch 21, and LED 19 comprise the transmit circuitry of the invention. LED 19 is coupled to an optical fiber 23 which couples a first telephone station (telephone Station 1) to a second telephone station (telephone Station 2).

The transceiver also includes receive circuitry including an amplifier 25 which is coupled between LED 19 and the input of transmit/receive switch 21. An input to a threshold detector 27 is coupled to the output of transmit/receive switch 21. The output of threshold detector 27 is coupled to a control unit 13. An output of threshold detector 27 is further coupled to a pulse-width demodulator 31. The output of pulse-width demodulator 31 is coupled to an input of a low-pass filter 33. The output of low-pass filter 33 is coupled to a capacitor 35 which is further coupled to the input of an amplifier 37. The output of amplifier 37 is connected so as to drive a speaker 39.

In operation, prior to receiving a signal from Station 2, phase-lock loop 15 controls the transmission frequency of Station 1 to cause Station 1 to transmit communication signals at a nominal free running frequency by timing the output voltage pulses of pulse-width modulator 14. When the output of phase-lock loop 15 goes high, it enables pulse-width modulator 14 to sample the output voltage of microphone 12 associated with Station 1. Because pulse-width modulator 14 samples the signals in discrete time intervals, the bandwidth of the microphone must be limited by using low-pass filter 11 to prevent distortion. Pulse-width modulator 14 samples the filtered voltage from low-pass filter 11 according to the control signals of phase-lock loop 15. The sampled voltage pulse output by pulse-width modulator 14 is transmitted to LED 19. LED 19 converts the voltage pulse to an optical pulse which is thereby transmitted over optical fiber 23 to telephone Station 2. Simultaneously, the voltage pulse output from pulse-width modulator 14 is passed through pulse stretcher circuit 17 to transmit/receive switch 21. Transmit/receive switch 21 is controlled by the output of pulse-width modulator 14 such that when pulse-width modulator 14 outputs a voltage pulse, transmit/receive switch 21 is opened thereby preventing the voltage pulse output from pulse-width modulator 14 from being applied to threshold detector 27. Likewise, when pulse-width modulator 14 is not outputting a voltage pulse, transmit/receive switch 21 is closed thus allowing a voltage pulse received from Station 2 to be passed through the transmit/receive switch 21 to threshold detector 27.

Pulse stretcher circuit 17 is employed so that the voltage pulse that is passed to the transmit/receive switch 21 is stretched slightly (i.e., has a slightly longer pulse duration) than the pulse duration of the original voltage pulse output from pulse-width modulator 14. Thus, transmit/receive switch 21 is maintained in an open position for a slightly longer period of time than the duration of the actual voltage pulse that is transmitted to Station 2 via LED 19. Pulse stretcher circuit 17 thereby creates a brief delay during which LED 19 may recover, thus preventing threshold detector 27 from erroneously triggering in response to an optical pulse being transmitted to Station 2 across LED 19 (rather than in response to a voltage pulse being received across LED 19 from Station 2).

When Station 1 desires to communicate with Station 2, Station 1 sends a series of voltage pulses to Station 2. This series of optical pulses is sent at Station 1's free running frequency. Likewise, Station 2 responds at its free running frequency. Thereafter, the control unit of each station adjusts its operating frequency until both control units are operating at the same frequency (until they have "locked up"). For the remainder of the communication, both stations operate at this same adjusted frequency.

In operation, when Station 1 is receiving an incoming optical pulse (which has been transmitted across optical fiber 23), the optical pulse is received by LED 19 and converted to a voltage pulse (receive pulse) that is proportional to the optical pulse received. The receive pulse is amplified by amplifier 25 and passed through transmit/receive switch 21 (which is closed because pulse-width modulator 14 is not outputting a voltage pulse). Threshold detector 27, which has the ability to discriminate between a receive pulse and random system noise, transmits the receive pulse virtually simultaneously to both time delay circuit 16 and pulse-width demodulator 31. Pulse-width demodulator 31 demodulates the receive pulse converting it back into the voltage signal as originally sampled from microphone 12 of the transmitting telephone station. Because pulse-width demodulator 31 changes its output voltage in steps in response to the changing width of each receive pulse, the demodulated voltage output from pulse-width demodulator 31 is fed to a filter 33 which filters the demodulated voltage to smooth out the voltage waveform. The voltage waveform output from filter 33 is passed through capacitor 35 which blocks any DC voltage which may be present on the line. The voltage waveform is then amplified by amplifier 37 and used to drive speaker 39.

Simultaneously, the receive pulse is passed through time delay circuit 16 to phase-lock loop 15. Time delay circuit 16 delays the receive pulse an amount of time equal to approximately ¼ of the time between two consecutive receive pulses the time between two consecutively received voltage pulses can be effectively described as 360°, thus time delay circuit 16 can be described as causing a 90° phase shift prior to passing it to phase-lock loop 15. Phase-lock loop 15 is configured so as to create an additional 90° delay prior to outputting a voltage pulse (the voltage pulse output by phase-lock loop 15 controls the sampling rate of pulse-width modulator 14, and thus controls the output or transmit frequency of the station). Thus, when both time delay circuit 16 and phase-lock loop 15 are employed, the total time delay between the time a pulse is received by Station 1 and the time a pulse is output by Station 1 is equal to a 180° phase shift, or ½ the time between two consecutive receive pulses. Time delay circuit 16 thereby sets the maximum transmission frequency and ensures the maximum time separation between data transmission and data receipt.

Figure 2:
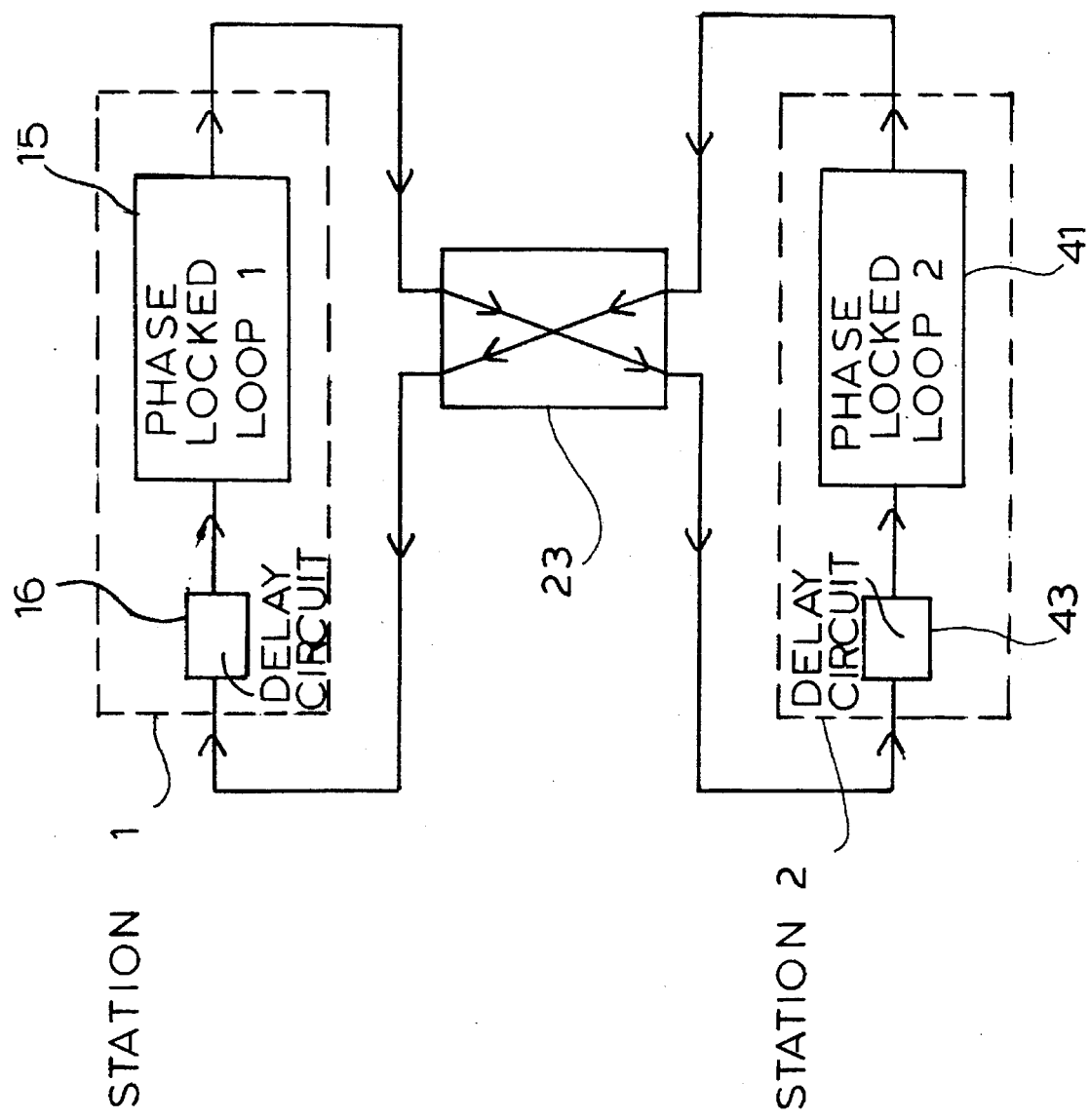
FIG. 2 is simplified block diagram for use in explaining the operation of the transceiver shown in FIG. 1.

FIG. 2 is a simplified block diagram for use in explaining the operation of the transceiver of FIG. 1. Station 1 includes phase-lock loop 15 and time delay circuit 16. Station 2 includes a phase-lock loop 41 and a time delay circuit 43. Stations 1 and 2 are connected through a single communication channel 23 which has a one-way channel propagation delay ($T_c$). A time delay ($T_t$) is associated with time delay circuit 16 and time delay circuit 43. Phase-lock loop 15 is cross coupled to phase-lock loop 41 such that the output of phase-lock loop 15 comprises the input of phase-lock loop 41 (via time delay circuit 43) and vice versa. Communication channel 23 is a media such as an optical fiber or the atmosphere (for radio frequencies).

One property of a phase-lock loop is that when it is locked, the frequency of the output signal is equal to the frequency of the input signal and there is a constant phase difference between the input and output signals. In many common phase-lock loops, this phase difference is 90° with the input signal leading the output signal. When in the configuration shown in FIG. 2, phase-lock loops 15 and 41 adjust their output frequencies until they match one another and the phase difference between the input and the output of each phase-lock loop is 90°. The input and output of each phase-lock loop will maintain this constant phase difference regardless Of the value of one-way propagation delay $T_c$. This constant phase difference can be used to prevent data collision at each station.

For the configuration of FIG. 2, in order for a 90° phase difference to exist between both the input and output of phase-lock loop 15 and the input and output of phase-lock loop 41, the output frequency of each phase-lock loop must satisfy Equation 1:

$$f = (2n+1)/[4(T_c + T_t)]$$

where n=0, 1, 2, 3 . . . and where ($T_c+T_t$)=the total propagation time between the output of one phase-lock loop and the input of the other phase-lock loop (where $T_t$ equals the time delay of only one of time delay circuits 16 or 43), and where f represents the output or transmission frequency of phase-lock loops 15 and 41. Equation 1 shows that an infinite number of frequencies will satisfy the 90° phase requirement; however, as will be shown, phase-lock loops 15 and 41 will run at a frequency closest to their free running frequency. Equation 1 also shows the need for time delay circuits 16 and 43. For instance, when Station 1 and Station 2 are very close together, one-way channel propagation delay ($T_c$) approaches 0. If $T_i$ of time delay circuit 16 and $T_i$ of time delay circuit 43 are also 0, the output frequencies of phase-lock loops 15 and 41 approach infinity even for n=0. Thus, among other things, time delay circuits 16 and 43 set the maximum output frequencies of phase-lock loops 15 and 41. As an example, assume that $T_i$ of time delay circuit 16 and $T_i$ of time delay circuit 43 both equal 20 μs and assume the free running frequency of phase-lock loops 15 and 41 is 10 KHz. Further assume Station 1 and Station 2 are very close together such that one-way channel propagation delay $T_c$ equals 0, the frequencies that satisfy Equation 1 are now 12.5 KHz, 37.5 KHz, 62.5 KHz . . . .

In operation, one station initially is turned on and begins transmitting at the free running frequency of 10 KHz. When the other station is turned on, phase-lock loops 15 and 41 will attempt to "lock up" to one another at 10 KHz, however, at this frequency, both phase-lock loop 15 and phase-lock loop 41 cannot satisfy the 90° phase requirement at the same time. Phase-lock loop 15 and phase-lock loop 41 will increase their output frequencies until both reach 12.5 KHz. The phase difference between the input and output at each phase-lock loop will be approximately 90° and the phase difference between the input and output of each station will be approximately 180° (due to the additional approximately 90° phase shift provided by time delay circuits 16 and 43). If the distance between Station 1 and Station 2 is now increased so that the one-way channel propagation delay $T_c$ equals 60 μs and the time delay $T_i$ of time delay circuits 16 and 43 remains 20 μs, the frequencies that satisfy Equation 1 are now 3.125 KHz, 9.375 KHz, 16,625 KHz, . . . When Station 1 and Station 2 are turned on, they will decrease their frequency until 9.375 KHz is reached because 9.375 KHz is the closest frequency to the free running frequency (10 KHz) that will satisfy Equation 1. Again the phase difference between the input and output of phase-lock loop 15 and the input and output of phase-lock loop 41 is 90° and the phase difference between the input and output of each station is approximately 180° regardless of the one-way propagation delay ($T_c$) of channel 23. This configuration is ideal for avoiding data collision at each station in a communication system. Data collision occurs when a single station transmits a voltage pulse at the same time it receives a voltage pulse. Thus, ensuring the maximum time separation between data receipt and data transmission is ideal for avoiding data collision.

Phase-lock loop 15 is configured such that it will adjust its frequency in order to satisfy Equation 1: $f=(2n+1)/[4(T_c+T_i)]$ and will be repelled by frequencies satisfying Equation 2: $f=n/[2(T_c+T_i)]$, where f equals frequency, and n equals an integer number 0, 1, 2, 3. . . The frequencies satisfying Equation 1 occur when the output waveform (or transmission frequency) of Station 1 is approximately 180° out of phase with the input (or receive) frequency of Station 1. The frequencies which satisfy Equation 2 occur when the output frequency of each station is in phase with the input frequency of each station (i.e. 0, 360, 720. . . ). Thus, the system in FIG. 1 automatically avoids phase-lock loop output frequencies where data collide, and instead adjusts to frequencies where there is a maximum time separation between the input of data to Station 1 and the output of data from Station 1.

Figure 3A:
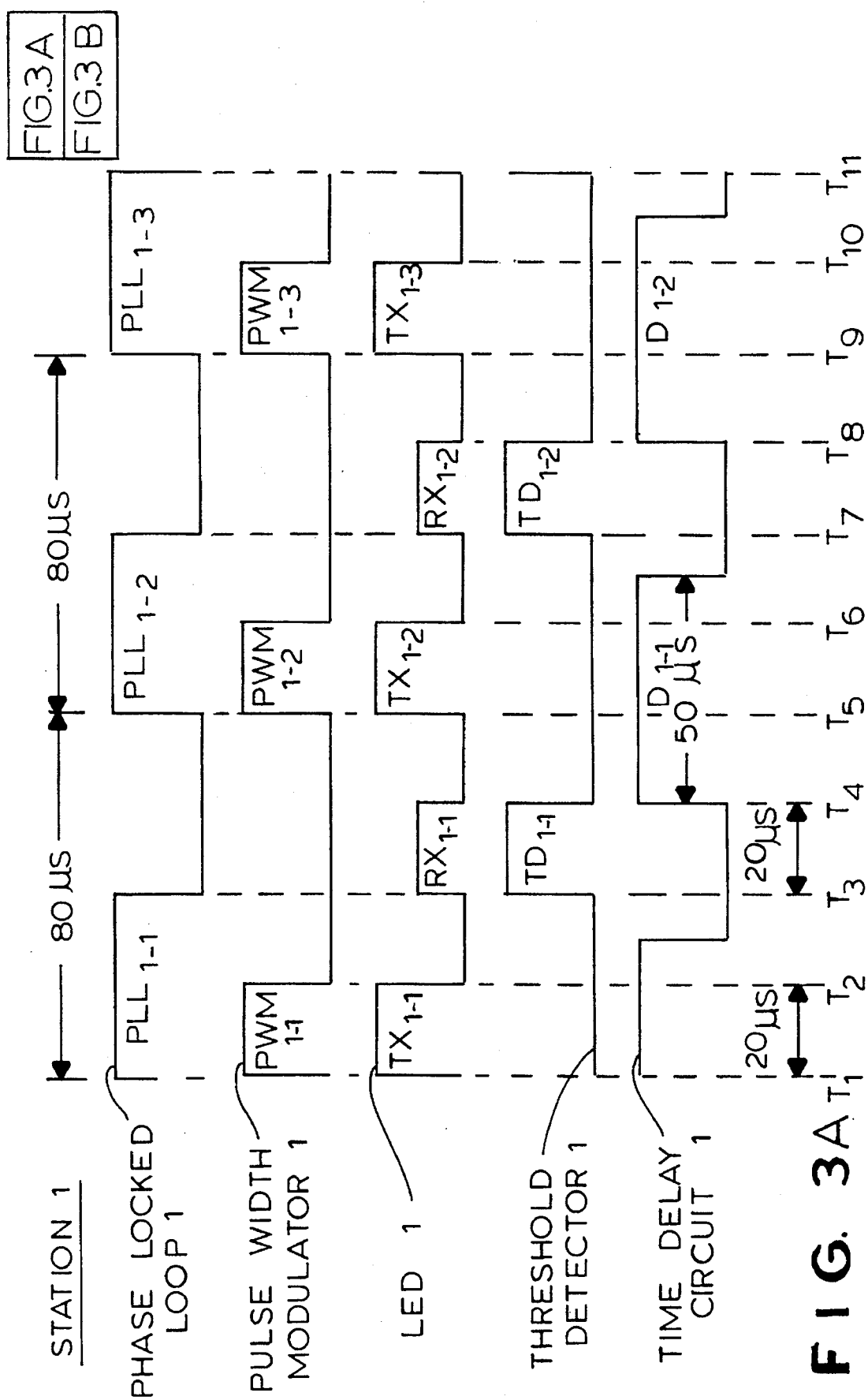

FIGS. 3A and 3B are timing diagrams useful in explaining the operation of the transceiver of FIGS. 1 and 2, wherein the one-way channel propagation delay $T_c$ equals 0, and the time delay ($T_i$) produced by each time delay circuit 16 and 43 equals 20 μs ($T_2-T_1$). At a first time $T_1$, phase-lock loop 15 of Station 1 (phase-lock loop 1) switches from a low state to a high state causing pulse-width modulator 14 of Station 1 (pulse-width modulator 1) to output a voltage pulse $PWM_{1-1}$ with a width proportional to the output voltage of microphone 12 of Station 1 (microphone 1). Voltage pulse $PWM_{1-1}$ output from pulse-width modulator 1 forward biases LED 19 of Station 1 (LED 1) and causes transmit/receive switch 21 of Station 1 (transmit/receive switch 1) to be in an open state. LED 1 produces an optical pulse $T_{x1-1}$ for a duration equal to the pulse width of voltage pulse $PWM_{1-1}$ output from pulse-width modulator 1. (The pulse-width duration is $T_2-T_1$ which in the present example equals 20 μs). As the channel propagation delay $T_c$ equals 0 (in this example), optical pulse $T_{x1-1}$ is instantly sent across optical fiber 23 to Station 2 (where it is received at $T_1$ by LED 2 as $R_{x2-1}$). Also at $T_1$, at Station 2 (FIG. 3B), phase-lock loop 15 of Station 2 (phase-lock loop 2) is in a low state preventing pulse-width modulator 14 of Station 2 (pulse-width modulator 2) from outputting a voltage pulse. LED 19 of Station 2 (LED 2) is, therefore, not forward biased and transmit/receive switch 21 of Station 2 (transmit/receive switch 2) is closed. LED 2 detects optical pulse $T_{x1-1}$ emitted by LED 1 and produces a voltage pulse $R_{x2-1}$ which is proportional to optical pulse $T_{x1-1}$ emitted from LED 1. Voltage pulse $R_{x2-1}$ is detected by threshold detector 27 of Station 2 (threshold detector 2) after being amplified by amplifier 25 of Station 2 (amplifier 2). Threshold detector 2 produces $TD_{2-1}$ a "cleaner" version of voltage pulse $R_{x2-1}$. Also at $T_1$ voltage pulse $TD_{2-1}$ output from threshold detector 2 is passed to both time delay circuit 16 of Station 2 (time delay circuit 2) and pulse-width demodulator 31 of Station 2 (pulse-width demodulator 2).

At a time $T_2$ occurring approximately 20 μs after time $T_1$, (when time delay circuit 2 first received voltage pulse $R_{x2-1}$), time delay circuit 2 outputs an approximately 50 μs voltage pulse ($D_{2-1}$) as shown by FIG. 3B. Voltage pulse $D_{2-1}$ output from time delay circuit 2 is fed into phase-lock loop 2 at time $T_2$ so that phase-lock loop 2 and phase-lock loop 1 may adjust their frequencies until they are locked up at the same frequency, each with a 90° lag in phase between a voltage pulse received ($D_{2-n}$) by a phase-lock loop and a voltage pulse output ($PLL_{2-n}$) from the phase-lock loop to the pulse-width modulator. To achieve this 90° lag in phase, a voltage pulse $PLL_{2-1}$ output from phase-lock loop 2 is delayed (by the internal configuration of phase-lock loop 2) so that $PLL_{2-1}$'s rising edge occurs approximately half way between the rising and falling edges of voltage pulse $D_{2-1}$ output by time delay circuit 2, as depicted at $T_3$ (resulting in a delay between the time voltage pulse $D_{2-1}$ is received by phase-lock loop 2 ($T_2$) and the time phase-lock loop 2 outputs voltage pulse $PLL_{2-1}$ ($T_3$)). Pulse-width demodulator 2 (not shown) (which also receives voltage pulse $TD_{2-1}$ output from threshold detector 2) converts the pulse width of $TD_{2-1}$ into a voltage signal. This voltage is then filtered and output from speaker 39 of Station 2 (speaker 2).

Additionally at Station 1 (FIG. 3A) at time $T_2$, the output of pulse-width modulator 1 returns to a low level causing LED 1 to be off and transmit/receive switch 1 to be closed. In this state Station 1 is ready to receive an optical pulse sent by Station 2.

At a time $T_3$, the output of phase-lock loop 1 switches to a low state while the output of phase-lock loop 2 switches to a high state. The rising edge of the output of phase-lock loop 2 controls the output of pulse-width modulator 2. The low level to high level transition high of phase-lock loop 2's output ($PLL_{2-1}$) causes pulse-width modulator 2 to output a voltage pulse ($PWM_{2-1}$) of approximately 20 μs duration.

LED 2 (also at time $T_3$) is forward biased by output $PWM_{2-1}$ of pulse-width modulator 2 and produces an optical pulse $T_{x2-1}$ which is sent through optical fiber 23 to LED 1. LED 1 instantly (as $T_c=0$) detects optical pulse $T_{x2-1}$ at ($T_3$) and produces a voltage pulse $R_{x1-1}$ (across LED 1) in response to absorption of optical pulse $T_{x2-1}$. Voltage pulse $R_{x1-1}$ has a width equal to the width of optical pulse $T_{x2-1}$ which is equal to the width of voltage pulse $PWM_{2-1}$ originally transmitted to LED 2 from pulse-width modulator 2. Voltage pulse $R_{x1-1}$ produced across LED 1 is amplified by amplifier 25 of Station 1 (amplifier 1). Threshold detector 27 of Station 1 (threshold detector 1) detects voltage pulse $R_{x1-1}$ and passes it (as $TD_{1-1}$) to time delay circuit 16 of Station 1 (time delay circuit 1) and to pulse-width demodulator 31 (not shown) of Station 1 (pulse-width demodulator 1). Pulse-width demodulator 1 produces a voltage level proportional to the width of voltage pulse $TD_{1-1}$ output from threshold detector 1. This voltage level is amplified by amplifier 37 of Station 1 and output through speaker 39 of Station 1.

At a time $T_4$, approximately 20 µs after time delay circuit 1 began receiving voltage pulse $R_{x2-1}$ ($T_i$=20 µs) time delay circuit 1 produces an output pulse $D_{1-1}$ of approximately 50 µs duration. Voltage pulse $D_{1-1}$ output from time delay circuit 1 is fed at $T_4$ to phase-lock loop 1 so that phase-lock loop 1 and phase-lock loop 2 may adjust their frequencies until they are locked up at the same frequency, each with a 90° lag in phase between the time a voltage pulse $D_{1-n}$ is received by a phase-lock loop and the time a voltage pulse $PLL_{1-n}$ is output from the phase-lock loop to the pulse-width modulator. To achieve this 90° phase lag, voltage pulse $PLL_{1-2}$ output from phase-lock loop 1 is delayed (by the internal configuration of phase-lock loop 1) so that its rising edge occurs approximately half way between the rising and falling edges of the output $D_{1-1}$ of time delay circuit 1 as depicted at $T_5$. Additionally, at $T_4$, the output voltage of pulse-width modulator 2 returns to a low level, turning off LED 2 and causing transmit/receive switch 2 to close. Station 2 may then receive an optical pulse sent by Station 1 over fiber 23.

The timing sequence described in $T_1$–$T_4$ repeats during $T_5$–$T_8$, $T_9$–$T_{12}$, .... Thus, the timing diagrams of FIGS. 3A and 3B demonstrate that data from Station 1 cannot collide with data from Station 2 because Station 1 is "locked" into a transmission frequency which is 180° out of phase with the transmission frequency of Station 2 (i.e. $T_{x2-1}$ occurs half way between $R_{x2-1}$ and $R_{x2-2}$; $R_{x2-1}$ and $R_{x2-2}$ being consecutively received by Station 2).

To clarify system operation, the operation of transmitting a single pulse from Station 1 and receiving the same pulse at Station 2 will be described with the aid of FIGS. 3A and 3B. As previously stated, in FIGS. 3A and 3B, the one-way channel propagation delay $T_c$ equals 0. Time delay $T_i$ produced by time delay circuit 1 of Station 1 and time delay circuit 2 of Station 2 is 20 µs. Phase-lock loop 1 and phase-lock loop 2 lock to the frequency closest to their free running frequency of 10 KHz which satisfies Equation 1:

$$f=[(2_n+1)/4(T_c+T_i)]$$

For n=0, $T_c$=0 and $T_i$=20 µs, f=1/80µs=12.5 KHz. This is the frequency phase-lock loop 1 and phase-lock loop 2 will lock to ensure noncollision of data transmission. As depicted in FIGS. 3A and 3B, the time period associated with the output of phase-lock loop 1 and phase-lock loop 2 is T=1/f=80 µs. Therefore, as shown in FIG. 3.0, every 80 µs phase-lock loop 1 and phase-lock loop 2 complete a full wave cycle. A time period of 80 µs is therefore equivalent to a 360° phase shift. Similarly, a 20 µs time period is equivalent to a 90° phase shift and a 40 µs time period is equivalent to a 180° phase shift. With this information understood, FIGS. 3A and 3B may be easily explained.

At a time $T_1$, FIG. 3B depicts that Station 2 is ready to receive information transmitted by Station 1. This is clear because at $T_1$ both phase-lock loop 2 and pulse-width modulator 2 are outputting low voltage levels. Because the output of pulse-width modulator 2 is at a low voltage level at time $T_1$, LED 2 is unbiased and transmit/receive switch 2 is closed. As will become clear, when either station has its LED unbiased and its transmit/receive switch closed, that station is able to receive optical information present on optical fiber 23. Therefore, at $T_1$, Station 2 is able to receive optical information transmitted across optical fiber 23 by Station 1.

Referring to Station 1, FIG. 3A, at time $T_1$ the output of phase-lock loop 1 switches from a low level to a high level. This causes pulse-width modulator 1 to output a voltage pulse $PWM_{1-1}$ with a pulse width proportional to the voltage output from microphone 1. [For convenience purposes, any slight delays associate with signal propagation, finite switching times, or other similar inherent delays are not depicted in FIGS. 3A and 3B. However, in reality, pulse-width modulator 1, for example, emits its voltage pulse slightly after it detects a low level to high level transition of phase-lock loop 1, even though FIG. 3A depicts both events at time T1]. Voltage pulse $PWM_{1-1}$ output from pulse-width modulator 1 forward biases LED 1, causing it to transmit an optical pulse $T_{x1-1}$, across optical fiber 23. This optical pulse has the same pulse width as the voltage pulse $PWM_{1-1}$ output by pulse-width modulator 1. (Approximately 20 µs as depicted in FIG. 3A). Because the propagation delay associated with optical fiber 23 is assumed to be negligible, FIG. 3B depicts LED 2 of Station 2 as detecting optical pulse $T_{x1-1}$ (i.e., receiving $R_{x2-1}$) at time $T_1$. (It should be understood that in reality a finite propagation delay is associated with optical fiber 23 and that LED 2 receives the optical pulse transmitted by LED 1 after this finite propagation time.) As previously stated, Station 2 is in a state to receive optical information sent by Station 1 across optical fiber 23. Therefore, in response to the absorption of optical signal $T_{x1-1}$ transmitted by LED 1, LED 2 develops a voltage $R_{x2-1}$ potential across itself. This voltage potential is only present while optical information is present on optical fiber 23. Therefore, voltage pulse $R_{x2-1}$ of duration equal to optical signal ($T_{x1-1}$), appears across LED 2 at time $T_1$.

Because transmit/receive switch 2 is also closed at $T_1$, as previously stated, voltage pulse $R_{x2-1}$ produced across LED 2 is detected by threshold-detector 2. Threshold detector 2 outputs a high voltage signal only when its input voltage exceeds a "threshold" voltage level. This threshold voltage level is chosen so that system noise is below the threshold level, while voltage pulse $R_{x2-1}$ (after being amplified by amplifier 2) is sufficient to exceed the threshold level. Therefore, threshold detector 2 produces $TD_{2-1}$ a cleaner version of voltage pulse $RX_{2-1}$ because it eliminates noise below the threshold voltage level.

At time $T_1$ voltage pulse $TD_{2-1}$ output from threshold detector 2 is passed to both time delay circuit 2 and to pulse-width demodulator 2. The operation of these two circuits will be described individually.

First, when pulse-width demodulator 2 (not shown) receives $TD_{2-1}$ from threshold detector 2, it converts $TD_{2-1}$'s pulse width into a voltage signal. (Not depicted in FIG. 3B). This voltage signal is filtered and output from speaker 2.

Second, once time delay circuit 2 receives $TD_{2-1}$ from threshold detector 2, (time $T_1$), time delay circuit 2 maintains a low level at its output for 20 μs until a time $T_2$. The 20 μs delay between $T_2$ and $T_1$ produces an approximately 90° phase shift, (as previously described), between the input and output of time delay circuit 2. FIG. 3B shows that at time $T_2$ after this 20 μs delay, time delay circuit 2 outputs an approximately 50 μs output pulse $D_{2-1}$. Output pulse $D_{2-1}$ is immediately received at the input of phase-lock loop 2. However, phase-lock loop 2 has an internally produced 90° phase shift between its input and output. Therefore, phase-lock loop 2 does not output a high voltage level until approximately 20 μs (90° phase shift) after receipt of $D_{2-1}$. This is depicted in FIG. 3B. Where at time $T_2$, $D_{2-1}$ is immediately detected by phase-lock loop 2; however, phase-lock loop 2 does not output a high voltage level until 20 μs (90°) after receiving $D_{2-1}$, as shown at time $T_3$. As will be described, Station 2 transmits optical information as a direct result of the low level to high level transition at the output of phase-lock loop 2. The total time delay between receipt of optical information ($R_{x2-1}$) and transmission of optical information ($T_{x2-1}$) by Station 2 is 40 μs. This corresponds to a 180° phase shift which ensures the maximum time separation between reception and transmission of data by Station 2.

At time $T_3$, the output of phase-lock loop 2 switches from a low state to a high state. This transition causes pulse-width modulator 2 to output a voltage pulse $PWM_{2-1}$ with a pulse-width proportional to the voltage output from microphone 2 (approximately 20 μs). LED 2 is forward biased by the output of pulse-width modulator 2 and, as a result, emits optical pulse $T_{x2-1}$ which is sent through optical fiber 23 to LED 1. Optical pulse $T_{x2-1}$ is of the same duration as voltage pulse $PWM_{2-1}$ output by pulse-width modulator 2.

Examining Station 1, FIG. 3A, it is apparent that at time $T_3$ both phase-lock loop 1 and pulse-width modulator 1 are outputting a low level. Because the output of pulse-width modulator 1 is at a low level at $T_3$, LED 1 is unbiased and transmit/receive switch 1 is closed. Therefore, at time $T_3$, Station 1 is able to receive optical information transmitted across fiber 23 by Station 2. Because the propagation delay associated with optical fiber 23 is assumed to be negligible, FIG. 3A depicts LED 1 of Station 1 as detecting the optical pulse sent by LED 2 at time $T_3$, even though it is understood that the events do not occur instantaneously.

In response to the absorption of optical pulse $T_{x2-1}$ transmitted by LED 2, LED 1 develops a voltage potential $R_{x1-1}$ across itself. This voltage potential is only present during the duration of the optical pulse sent by LED 2. Therefore, voltage pulse $R_{x1-1}$ of duration equal to optical signal $T_{x1-2}$ appears across LED 1 at time $T_3$.

Because transmit/receive switch 1 is closed at $T_3$, as previously stated, the voltage pulse $R_{x1-1}$ produced across LED 1 is amplified by amplifier 1 and detected by threshold detector 1. The voltage pulse $TD_{1-1}$ output by threshold detector 1, at time $T_3$, is then passed to both time delay circuit 1 and pulse-width demodulator 1. At time $T_3$ when pulse-width demodulator 1 receives output pulse $TD_{1-1}$ from threshold detector 1, it converts the pulse width of $TD_{1-1}$ into a voltage signal, which is then filtered and output from speaker 1. (These operations are not depicted in FIG. 3A).

Once output $TD_{1-1}$ from threshold detector 1 is received by time delay circuit 1, time delay circuit 1 maintains its output at a low voltage level for 20 μs, (from $T_3$–$T_4$). At $T_4$ time delay circuit 1 outputs an approximately 50 μs voltage pulse $D_{1-1}$. As discussed previously, a 20 μs time delay is equivalent to a 90° phase shift. Thus, time delay circuit 1 creates a 90° phase shift between the time it receives a signal and the time it outputs a signal.

Immediately after time delay circuit 1 outputs $D_{1-1}$, $D_{1-1}$ is received by phase-lock loop 1 (at time $T_4$). However, phase-lock loop 1 does not output a high voltage level until 20 μs after receipt of voltage pulse $D_{1-1}$. This low to high level transition occurs at time $T_5$. The 20 μs time delay between $T_4$ and $T_5$ produces a 90° phase shift between the input and output of phase-lock loop 1.

As previously described, when the output of phase-lock loop 1 makes a low level to high level transition, pulse-width modulator 1 outputs a voltage pulse which forward biases LED 1, resulting in the transmission of optical information from Station 1 to Station 2. Therefore, due to the 20 μs delay produced by time delay circuit 1 and the 20 μs delay produced by phase-lock loop 1, a total of 40 μs (or a 180° phase shift) exists between the time data is sent and the time data is received by Station 1. The communication system described therefore automatically optimizes the time between each stations transmission and receipt of information, so as to ensure noncollision of information.

Figure 4B:
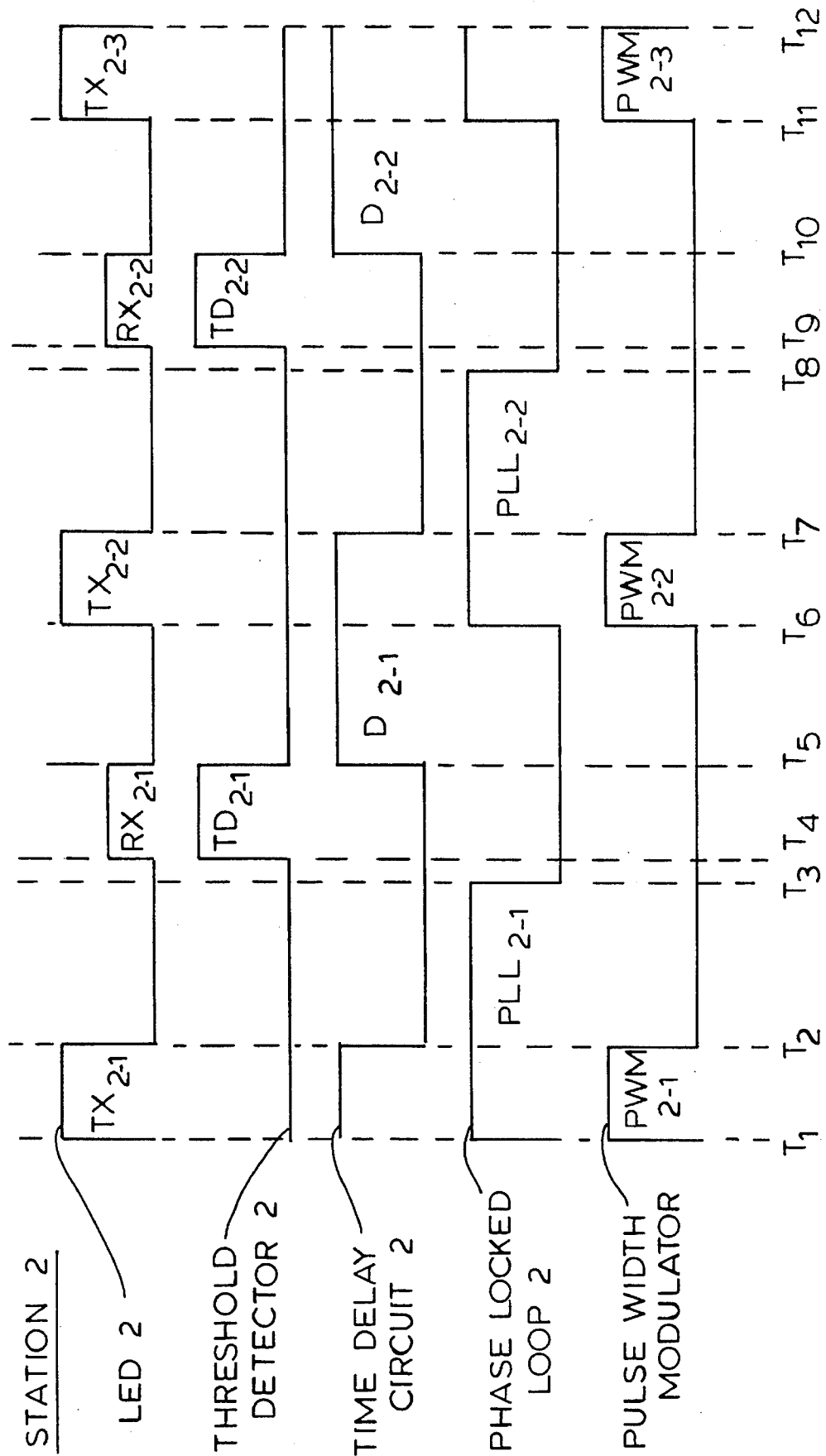

FIGS. 4A and 4B are timing diagram useful in explaining the operation of the transceiver of FIGS. 1 and 2 wherein the one-way channel propagation delay $T_c$ equals 60 μs and the time delay ($T_i$) produced by each time delay circuit (time delay circuit 1 and 2) equals 20 μs. Phase-lock loop 1 and phase-lock loop 2 lock to the frequency closest to their free running frequency of 10 KHz, which satisfies Equation 1:

$$f=[2n+1/4(T_c+T_i)].$$

Where f represents frequency, n represents an integer number 0, 1, 2, 3 . . . , $T_c$ equals the total one-way channel propagation delay, and $T_i$ equals the internal delay associated with time delay circuits 1 and 2. When $T_c$=60 μs, and $T_i$=20 μs, the frequency satisfying Equation 1 which is closest to the free running frequency of the phase-lock loops is 9.375 KHz. Therefore, phase-lock loop 1 and phase-lock loop 2 each have a time period between output voltage pulses which equals 106.7 μs (or T=1/f where T represents the time period between output voltage pulses and f equals the frequency of the output voltage pulses). Referring to FIG. 4A, at a time $T_1$, the output of phase-lock loop 1 switches from a low level to a high level causing pulse-width modulator 1 to sample the voltage signal output by microphone 1 and to output a voltage pulse $PWM_{1-1}$ with a width proportional to microphone 1's output voltage. Voltage pulse $PWM_{1-1}$ output from pulse-width modulator 1 forward biases LED 1 while causing transmit/receive switch 1 to open. At $T_1$, therefore, threshold detector 1 detects no voltage signal and outputs a low state. LED 1 produces an optical pulse $T_{x1-1}$ of duration (or width) equal to the duration of the voltage pulse output by pulse-width modulator 1. (Pulse duration equalling $T_2$–$T_1$). Optical pulse $T_{x1-1}$ is transmitted to Station 2 via optical fiber 23. As depicted by FIGS. 4A and 4B, the transmitting period of each phase-lock loop (106.7 μs) ensures that when Station 1 transmits an optical pulse across optical fiber 23, Station 2 will be in a state to receive the optical pulse when it arrives at a time $T_c$ (in this example 60 μs) after being transmitted from Station 1. The reverse of this is also true; when Station 2 sends an optical pulse across optical fiber 23, Station 1 will be in a state to receive the optical pulse when it arrives at Station 1 at a time $T_c$ after being sent. Also at time $T_1$, phase-lock loop 2 outputs a voltage pulse $PLL_{2-1}$ causing pulse-width modulator 2 to sample the voltage signal output by microphone 2 and therefore to output a voltage pulse PWM$_{2-1}$ with a width proportional to the voltage output by microphone 12 of Station 2 (microphone 2). Voltage pulse PWM$_{2-1}$ output by pulse-width modulator 2 causes LED 2 to forward bias and to transmit an optical pulse T$_{x2-1}$ (of width equal to the pulse width of PWM$_{2-1}$ pulse-width modulator 2) through optical fiber 23. Therefore, both Station 1 and Station 2 transmit optical pulses (T$_{x1-1}$ and T$_{x2-1}$) across optical fiber 23 simultaneously. No interference will occur because T$_{x1-1}$ and T$_{x2-1}$ are optical pulses traveling in opposite directions.

Data collision only occurs when one station attempts to transmit and receive an optical pulse at the same time. Optical pulses may cross paths on optical fiber 23 without a collision occurring. Collision only occurs if transmit and receive pulses are simultaneously present on the transmit/receive means (LED 19) at one station, not when they are simultaneously present on the fiber.

As depicted in FIGS. 4A and 4B, both the output of pulse-width modulator 1 and the output of pulse-width modulator 2 return to a low voltage level at T$_2$. The low voltage level at the output of pulse-width modulator 1 causes LED 1 to shut off and transmit/receive switch 1 to close, allowing threshold detector 1 to detect voltage signals present on LED 1. Similarly, the low voltage level at the output of pulse-width modulator 2 causes LED 2 to shut off and transmit/receive switch 2 to close, allowing detection of signals present on LED 2 by threshold detector 2. Thus, after time T$_2$ both Station 1 and Station 2 are able to receive signals sent over fiber 23. At time T$_3$, phase-lock loop 1 and phase-lock loop 2 output low voltage levels.

About 60 μs after Station 1 transmits optical pulse T$_{x1-1}$ across fiber 23 (pulse T$_{x1-1}$ transmitted at T$_1$), the optical pulse T$_{x1-1}$ arrives at LED 2 of Station 2 at time T$_4$. Also at T$_4$, optical pulse T$_{x2-1}$ transmitted across fiber 23 at time T$_1$ by Station 2, arrives at LED 1. As stated, Station 1 and Station 2 are able to receive signals sent over fiber 23 after time T$_2$. Thus, at T$_4$, LED 1 of Station 1 detects optical pulse T$_{x2-1}$ sent over fiber 23 by Station 2 and produces a voltage pulse of width equal to the width of optical pulse T$_{x2-1}$. This voltage pulse is labelled R$_{x1-1}$ in FIG. 4A. Because transmit/receive switch 1 is closed, threshold detector 1 detects voltage pulse R$_{x1-1}$ present at LED 1 (after R$_{x1-1}$ is amplified by amplifier 1). The output TD$_{1-1}$ of threshold detector 1, a cleaner version of voltage pulse R$_{x1-1}$, is passed to time delay circuit 1 and to pulse-width demodulator 1. Pulse-width demodulator 1 (not shown) produces a voltage level proportional to the width of voltage pulse TD$_{1-1}$ output from threshold detector 1. This voltage level is amplified and output through speaker 39.

The operation of time delay circuit 1 will now be described. Once time delay circuit 1 receives the output from threshold detector 1, at time T$_4$ in FIG. 4A, time delay circuit 1 maintains a low level at its output for approximately 20 μs (until time T$_5$). At time T$_5$, time delay circuit 1 outputs an approximately 50 μs duration voltage pulse D$_{1-1}$ which is input to phase-lock loop 1. Due to the internal configuration of phase-lock loop 1 a 90° phase shift exists between its input and output. Because of this phase shift, the output of phase-lock loop 1 is maintained at a low level until time T$_6$, even though the input to phase-lock loop 1 D$_{1-1}$ is received at time T$_5$. As previously stated, when the output of phase-lock loop 1 switches from a low level to a high level, pulse-width modulator 1 emits a voltage pulse PWM$_{1-2}$ which forward biases LED 1, causing LED 1 to transmit optical pulse T$_{x1-2}$ across optical fiber 23. Because of the delays associated with time delay circuit 1 and phase-lock loop 1, an overall time delay of T$_6$–T$_4$ exists between the time a pulse is received by Station 1 and the time a pulse is transmitted by Station 1. This time delay results in an approximately 180° phase shift between pulses received and pulses transmitted from Station 1. (The 90° shift due to time delay circuit 1 plus the 90° shift due to phase-lock loop 1).

Station 2's operation is identical to the operation Station 1. Referring to FIGS. 4A and 4B, the optical pulse T$_{x1-1}$ originally transmitted across fiber 23 by Station 1 at time T$_1$ arrives a LED 2 at time T$_4$. The time difference T$_4$–T$_1$ equalling 60 μs is the one-way propagation delay T$_c$ associated with optical fiber 23. That is, when T$_{x1-1}$ is transmitted at time T$_1$, it takes 60 μs (T$_c$) for T$_{x1-1}$ to arrive at Station 2. Thus, T$_{x1-1}$ arrives at LED 2 at time T$_4$ (T$_1$+60 μs). LED 2 produces a voltage pulse R$_{x2-1}$ of pulse width equal to that of received optical pulse T$_{x1-1}$.

At time T$_4$, the output of pulse-width modulator 2 is at a low level. Because the output of pulse-width modulator 2 is at a low level, transmit/receive switch 2 is closed and threshold detector 2 is able to detect voltage pulse R$_{x2-1}$ present at LED 2. (R$_{x2-1}$ is amplified by amplifier 2 prior to detection by threshold detector 2).

The output of threshold detector 2, a cleaner version of voltage pulse R$_{x2-1}$, is passed to time delay circuit 2 and to pulse-width demodulator 2 (not shown). Pulse-width demodulator 2 produces a voltage level proportional to the width of voltage pulse TD$_{2-1}$ output by threshold detector 2. This voltage level is amplified and output through a speaker.

The operation of time delay circuit 2 is identical to that of time delay circuit 1. After about a 20 μs delay (depicted as T$_5$–T$_4$) after receiving at T$_4$ the output TD$_{2-1}$ of threshold detector 2, time delay circuit 2 produces a 50 μs duration voltage pulse D$_{2-1}$ which is fed to the input of phase-lock loop 2. An additional delay depicted as T$_6$–T$_5$ occurs between the input and output of phase-lock loop 2. Delay T$_6$–T$_5$ is a result of the inherent 90° phase shift between the input and output of phase-lock loop 2. The total time delay T$_6$–T$_4$ results in a 180° phase shift between optical pulses received and optical pulses transmitted by Station 2.

Similarly, at a time T$_6$, both Station 1 and Station 2 transmit optical pulses T$_{x2-2}$ and T$_{x1-2}$. After a time T$_c$ (equal to the one-way propagation delay across fiber 23), at a time T$_9$, both Station 1 and Station 2 receive optical pulses T$_{x2-2}$ and T$_{x1-2}$. Therefore, regardless of the one-way propagation delay T$_c$ associated with optical fiber 23, phase-lock loop 1 and phase-lock loop 2 adjust their operating frequencies to ensure that data collision is avoided. That is, phase-lock loop 1 and phase-lock loop 2 automatically adjust their frequencies such that a transmission (i.e., T$_{x1-2}$ at time T$_6$) occurs halfway between two consecutively received voltage pulses (i.e. halfway between R$_{x1-1}$ at T$_4$ and R$_{x1-2}$ at T$_9$).

To clarify system operation, the process of transmitting a single pulse from Station 1 and receiving the same pulse at Station 2 will be described with the aid of FIGS. 4A and 4B.

In FIGS. 4A and 4B, the one-way channel propagation delay, T$_c$, equals 60 μs. Also, the time delay, T$_j$, produced by each time delay circuit (time delay circuit 1 of Station 1 and time delay circuit 2 of Station 2) is 20 μs. As indicated, phase-lock loop 1 and phase-lock loop 2 lock to the frequency closest to their free running frequency of 10 KHz which satisfies Equation 1:

$$f=[2_n+1/4(T_c+T_i)]$$

when T$_c$ 60 μs and T$_j$=20 μs, the frequency closest to 10 KHz satisfying Equation 1 is 9.375 KHz. Therefore, phase-lock loop 1 and phase-lock loop 2 each have a time period between output voltage pulses which equals 106.7 μs (or T=1/f where T represents the time period between output voltage pulses and f equals the frequency of the output voltage pulses as depicted in FIGS. 4A and 4B). As depicted in FIGS. 4A and 4B, every 106.7 μs phase-lock loop 1 and phase-lock loop 2 complete a full wave cycle. A time period of 106.7 μs is therefore equivalent to a 360° phase shift. Similarly, a 26.675 μs time period 106.7 μs divided by 4, is equivalent to a 90° phase shift and a 53.35 μs time period 106.7 μs divided by 2, is equivalent to a 180° phase shift. With this information understood, transmission of a single pulse will now be explained with the aid of FIGS. 4A and 4B.

Referring to Station 1, FIGS. 4A, at time $T_1$, the output of phase-lock loop 1 switches from a low level to a high level. This low to high level transition causes pulse-width modulator 1 to output a voltage pulse $PWM_{1-1}$ with a pulse width proportional to the voltage output from microphone 1. Voltage pulse $PWM_{1-1}$ output from pulse-width modulator 1 forward biases LED 1, causing it to transmit an optical pulse $T_{x1-1}$ across optical fiber 23. Optical pulse $T_{x1-1}$ has the same pulse width as the voltage $PWM_{1-1}$ output by pulse-width modulator 1.

The propagation delay associated with optical fiber 23 is assumed to be 60 μs. Therefore, optical pulse $T_{x1-1}$ transmitted by LED 1 at time $T_1$ does not arrive at Station 2 until a time $T_4$ ($T_1$+60 μs). Referring to the Station 2, FIG. 4B, at time $T_4$, the optical pulse transmitted at time $T_1$ from Station 1 arrives at Station 2. At $T_4$ pulse-width modulator 2 is outputting a low voltage level. This low voltage level causes LED 2 to be unbiased and transmit/receive switch 2 to be closed.

Because LED 2 is unbiased at $T_4$, LED 2 absorbs optical pulse $T_{x1-1}$ transmitted by Station 1, producing a voltage pulse $R_{x2-1}$ across itself. Voltage pulse $R_{x2-1}$ has duration equal to that of optical pulse $T_{x1-1}$. Voltage pulse $R_{x2-1}$ is amplified by amplifier 2 and is then detected by threshold detector 2, as $TD_{2-1}$ at time $T_4$. Output $TD_{2-1}$ of threshold detector 2 is passed to both time delay circuit 2 and to pulse-width demodulator 2.

Once time delay circuit 2 receives $TD_{2-1}$ output from threshold detector 2, time delay circuit 2 maintains a low level at its output for 20 μs until a time $T_5$. (The 20 μs delay between $T_5$ and $T_4$ produces an approximately 90° phase shift between the input and output of time delay circuit 2). After the 20 μs delay, at time $T_5$, time delay circuit 2 outputs $D_{2-1}$ an approximately 50 μs output pulse. Output pulse $D_{2-1}$ is immediately received at the input of phase-lock loop 2. However, phase-lock loop 2 does not output a high voltage level until a time $T_6$.

A total time delay of $T_6-T_4$ therefore exists between the time Station 2 first receives the optical pulse transmitted by Station 1 and the time phase-lock loop 2 outputs a high voltage level.

As seen in FIG. 4, $T_6-T_4$ equals approximately ½ the period of the signal output by pulse-width modulator 2. Therefore, $T_6-T_4$ produces an approximately 180° phase shift.

As stated, at time $T_6$, the output of phase-lock loop 2 changes from a low level to a high level. This transition causes pulse-width modulator 2 to output a voltage pulse $PWM_{2-2}$ with a pulse width proportional to the voltage output from microphone 1. Voltage pulse $PWM_{2-2}$ is of duration $T_7-T_6$ in FIG. 4B. As shown at $T_6$ voltage pulse $PWM_{2-2}$ output from pulse-width modulator 2 forward biases LED 2, causing it to transmit an optical pulse $T_{x2-2}$ across fiber 23. This optical pulse has the same pulse width as the voltage $PWM_{2-2}$ output by pulse-width modulator 2.

As stated, Station 2 receives the optical pulse transmitted by Station 1 at time $T_4$ but does not transmit an optical pulse until time $T_6$. The time delay $T_6-T_4$, produces an approximately 180° phase shift, and therefore ensures the maximum separation between Station 2's receive and transmit operations. Because the propagation delay associated with optical fiber 23 is 60 μs, optical pulse $T_{x2-2}$ transmitted by LED 2 at time $T_6$ does not arrive at Station 1 until a time $T_9$ ($T_6$+60 μs).

Referring to Station 1, FIG. 4A, at time $T_9$, the time at which optical pulse $T_{x2-2}$ arrives at Station 2, pulse-width modulator 1 is outputting a low voltage level. This low voltage level causes LED 1 to be unbiased and transmit/receive switch 1 to be closed.

Because LED 1 is unbiased at $T_9$, LED 1 absorbs the optical pulse transmitted by Station 2, producing a voltage pulse $R_{x1-2}$ across itself. $R_{x1-2}$ has a duration equal to that of optical pulse $T_{x2-2}$. Voltage pulse $R_{x1-2}$ is amplified by amplifier 1 and is then detected by threshold detector 1, as $TD_{1-2}$. Output $TD_{1-2}$ of threshold detector 1 is passed to both time delay circuit 1 and to pulse-width demodulator 1.

After time delay circuit 1 receives the output $TD_{1-2}$ from threshold detector 1, (as seen at time $T_9$), time delay circuit 1 maintains a low level at its output until a time $T_{10}$. At time $T_{10}$, time delay circuit 1 outputs $D_{1-2}$ an approximately 50 μs output pulse. This output pulse is immediately received at the input of phase-lock loop 1. However, phase-lock loop 1 does not output a high voltage level until time $T_{11}$.

A total time delay of $T_{11}-T_9$ therefore exists between the time Station 1 first receives optical pulse $T_{x2-2}$ transmitted by Station 2 and the time phase-lock loop 1 outputs a high voltage level ($PLL_{1-3}$). As shown in FIG. 4A, $T_{11}-T_9$ equals approximately ½ the period of the signal output by pulse-width modulator 1. Therefore, $T_{11}-T_9$ produces an approximately 180° phase shift.

At time $T_{11}$, the output of phase-lock loop 1 changes from a low level to a high level. This transition causes pulse-width modulator 1 to output a voltage pulse $PWM_{1-3}$ with a pulse width proportional to the voltage output from microphone 1. This voltage pulse is of duration $T_{12}-T_{11}$. As shown at $T_{11}$, voltage pulse $PWM_{1-3}$ output from pulse-width modulator 1 forward biases LED 1, causing it to transmit an optical pulse $T_{x1-3}$ across fiber 23. This optical pulse has the same pulse width as voltage pulse $PWM_{1-3}$ output by pulse-width modulator 1.

Therefore, Station 1 receives the optical pulse transmitted by Station 2 at time $T_9$ but does not transmit an optical pulse until time $T_{11}$. The time delay $T_{11}-T_9$, produces an approximately 180° phase shift and therefore ensures the maximum separation between the time Station 1 receives an optical pulse and the time Station 1 transmits an optical pulse.

Now that the preferred embodiments of the present invention have been shown and described in detail, various modifications and improvements thereon will become readily apparent to those skilled in the art. For instance, although the apparatus of the present invention has been described with respect to a specific circuit configuration, alternative circuitry may be employed, i.e. signal modulation may be achieved by methods other than pulse-width modulation, phase-lock loops with phase shifts other than 90° may be employed, phase shifts may be achieved by circuitry other than a phase-lock loop, the signal may be used to drive a device other than a speaker, and the time delay circuits, various filters or other circuit components may be altered or omitted. Accordingly, the spirit and scope of the present invention is to be construed broadly and limited only by the appended claims, and not by the foregoing specification.

What is claimed is:

1. A method of communicating information between spaced first and second stations coupled together by a communications channel, comprising the steps of:
   a) transmitting information signals from the first station over the communications channel to the second station at a frequency assigned to the first station;
   b) transmitting information signals from the second station over the communications channel to the first station at a frequency assigned to the second station in response to receiving information signals from the first station;
   c) adjusting the signal frequencies of the first and second stations based upon the transmitted information signals received by the first and second stations so that the first and second stations transmit information between the first and second stations at a single frequency;
   wherein adjusting the signal frequencies permits full duplex operation over a single communications channel.

2. The method of claim 1 wherein in the adjusting step the single frequency satisfies the equation:

$$f=(2n+1)/\{4(T_c+T_i)\},$$

where:
   $n=0, 1, 2, \ldots,$
   f represents the single frequency,
   $T_c$ represents a one-way propagation delay of the communications channel, and
   $T_i$ represents a delay which occurs at both the first and the second station.

3. The method of claim 1 further comprising the step of delaying transmission of a single outgoing voltage pulse for a period of time after receipt of the incoming voltage pulse to prevent collision of the incoming and outgoing signal.

4. The method of claim 3 wherein in the delaying step the delay time is selected to ensure that the outgoing voltage pulse occurs at a time approximately halfway between receipt of a first incoming information signal and receipt of the next consecutive incoming information signal.

5. The method of claim 1 wherein the adjusting step is achieved by employing a first phase-lock loop at the first station, and a second phase-lock loop at the second station, the first phase-lock loop and the second phase-lock loop being coupled such that an outgoing signal of the first phase-lock loop is input as an incoming signal to the second phase-lock loop, and such that an outgoing signal of the second phase-lock loop is input as an incoming signal to the first phase-lock loop.

6. The method of claim 3 wherein the delaying step is achieved by employing, a first phase-lock loop at the first station and a second phase-lock loop at the second station.

7. A transceiver for transmitting and receiving information comprising:
   a) a receive circuit for receiving a series of incoming voltage pulses;
   b) a transmit circuit for transmitting a series of outgoing voltage pulses, the transmit circuit including a frequency control mechanism operatively coupled to the receive circuit to receive the incoming series of voltage pulses and in response to receipt thereof, to adjust the frequency of the series of outgoing voltage pulses such that the incoming and outgoing series of voltage pulses are transmitted at a single frequency, and such that the transmit circuit is not transmitting an outgoing voltage pulse at the same time the receive circuit is receiving an incoming voltage pulse.

8. The apparatus of claim 7 comprises a delay circuit operatively coupled to the receive circuit and such that the delay circuit delays the incoming voltage pulse by a selected amount of time prior to passing the voltage pulse to the frequency control mechanism.

9. The apparatus of claim 7 wherein the outgoing voltage pulse is output from the frequency control mechanism at a time approximately halfway between input of a first incoming voltage pulse and input of the next consecutive incoming voltage pulse to the frequency control mechanism.

10. A communication system for facilitating communication along a communication channel having a first communication station and a second communication station, the first communication station being located at a distance from the second communication station, comprising:
    a) a first frequency control circuit located at the first station including a first delay circuit;
    b) a second frequency control circuit located at the second station, including a second delay circuit, the first and second frequency control circuits being operatively coupled together such that the first frequency control circuit adjusts an output frequency of the first station and the second frequency control circuit adjusts an output frequency of the second station until the output frequency of the first station and the output frequency of the second station are equal;
    c) a first signal modulator operatively coupled to the first frequency control circuit such that a signal output from the first frequency control circuit controls the operation of the first signal modulator;
    d) a second signal modulator operatively coupled to the second frequency control circuit such that a signal output from the second frequency control circuit controls the operation of the second signal modulator.

11. The apparatus of claim 10 wherein the first delay circuit delays a signal a given amount of time producing a 90° phase shift between the time the signal is received by the first time delay circuit and the time the signal is output by the first time delay circuit.

12. The apparatus of claim 10 wherein the first frequency control circuit and the second frequency control circuit are configured so as to adjust the output frequencies of the first and second stations to satisfy the equation:

$$f=(2n+1)/\{4(T_c+T_i)\},$$

where:
   $n=0, 1, 2, \ldots,$
   f represents the output frequency of the first and second stations,
   $T_c$ represents a one-way propagation delay of the communication channel, and
   $T_i$ represents a delay which occurs at either the first or the second station.

13. The apparatus of claim 10 wherein the first frequency control circuit and the second frequency control circuit have an acceptable operating frequency range such that only a single frequency within the operating frequency range satisfies the equation:

$$f=(2n+1)/\{4(T_c+T_i)\},$$

where:

n=0, 1, 2, ..., f represents the output frequency of the first and second stations, $T_c$ represents a one-way propagation delay of the communication channel, and $T_i$ represents a delay which occurs at either the first or the second station.

14. An apparatus for facilitating communication along a communication channel, said communication channel having a first station and a second station, each station having a transmitting data unit and a receiving data unit, the apparatus comprising:

a) a modulator coupled to the transmitting data unit of a first station; the modulator for sampling data to be output from said data unit;

b) a sampling controller coupled to the modulator for controlling the frequency at which the modulator samples data;

c) a transmitter operatively coupled to the modulator, for transmitting data from the modulator to the receiving data unit of a second station;

d) a receiver for receiving data from the transmitting data unit of the second station, the receiver coupled to the sampling controller such that a portion of the received data is fed to the sampling controller, wherein the sampling controller adjusts the frequency at which the modulator samples data in response to said portion of the received data;

e) a demodulator coupled to the receiver for demodulating the received data; and f) an output operatively coupled to the receiver.

15. The apparatus of claim 14 wherein the sampling controller is located at a first station and is coupled to a sampling controller of a second station.

16. The apparatus of claim 14 wherein the sampling controller is configured in such a way that the portion of the received data that is fed to the sampling controller is shifted 90°.

17. The apparatus of claim 14 wherein the sampling controller is located at a first station and is coupled to a sampling controller of a second station wherein the sampling controller of the first station and the sampling controller of the second station operate simultaneously.

* * * * *